Patented Mar. 11, 1952

2,588,378

UNITED STATES PATENT OFFICE 2,588,378

FOAM STABILIZATION

Alexander Frieden, Whitefish Bay, and Harold H. Geller, Milwaukee, Wis.

No Drawing. Application November 5, 1949, Serial No. 125,842

14 Claims. (Cl. 99—48)

This invention relates to fermented malt beverages, for example, beer, ale and porter, which are characterized by the capacity for forming a stable foam.

Traditionally beer is supposed to have a good head. The appeal of a glass of beer to the consumer is greater when it has a relatively stable foam with fine bubbles. Consequently it is considered quite important to produce beer which will have a good quality and lasting foam when poured into a glass. The formation of a large initial volume of a foam depends to a great extent on the degree of carbonation and can be varied within limits, but to produce a foam that has fine bubbles and that does not collapse readily, remaining stable over a reasonable period of time, is more difficult.

One of the objects of the present invention is to provide a new and improved method for stabilizing foams of fermented malt beverages.

Another object of the invention is to produce fermented malt beverages possessing a greatly improved foam-head retention capacity.

An additional object of the invention is to provide a new and improved method of stabilizing foams in carbon dioxide containing beverages.

A further object of the invention is to provide a new and improved method of stabilizing foams in carbon dioxide containing beverages in which proteins are present in dispersed or dissolved form.

A more specific object of the invention is to provide a new and improved method of stabilizing beer foam.

Another object of the invention is to provide a new and improved beer characterized by its improved foam-head retention capacity. Other objects will appear hereinafter.

In accordance with the invention we have discovered that the foam-head retention capacity of a fermented malt beverage, for example, beer, may be substantially increased by the addition thereto of small amounts of the order of a fraction of a per cent of a water soluble salt of carboxy methyl hydroxy ethyl cellulose, typical of which is the sodium salt of carboxy methyl hydroxy ethyl cellulose produced by the Hercules Powder Company and designated as CMHEC. This material may be added to the beverage at any suitable time in the process of manufacture. In the production of beer it is preferably added after the first filtration and before the final filtration. Excellent results have been obtained by incorporating the soluble carboxy methyl hydroxy ethyl cellulose with the beer at least twenty-four hours prior to the final filtration of the beer.

It has been known that various natural gums, such as gum arabic, are capable of improving, to a degree, the stability of beer foams. We have found surprisingly that soluble carboxy methyl hydroxy ethyl cellulose in the form of an alkali salt, particularly the sodium salt of carboxy methyl hydroxy ethyl cellulose is many times more effective than the natural gums in improving the foam stability of beverages such as beer and ale.

The quantity of the foam stabilizing agent which is required for the purpose of the invention is very small. In most instances, an amount within the range of 50 to 500 parts by weight of the soluble carboxy methyl hydroxy ethyl cellulose per million parts by weight of the foam forming liquid will be satisfactory to enhance the foam stability.

In order to measure the increase in foam stability produced by the soluble carboxy methyl hydroxy ethyl cellulose, the sigma method was used. This method is described in the proceedings of the American Society of Brewing Chemists for 1940. It consists of producing a foam in a foam forming liquid such as beer by passing a stream of carbon dioxide through a porous cylinder, and then measuring the liquid volumes in the collapsed and uncollapsed foam after a given period of time. The sigma value is calculated by the formula given in the article referred to above.

The following examples illustrate the use of soluble carboxy methyl hydroxy ethyl cellulose as a foam stabilizer but are not intended to limit the invention. In the examples the percentages and proportions are calculated on a weight basis unless otherwise specified.

Example I

Beer from the fermenters was stored in the usual manner, and then subjected to the first filtration. A 1% solution of carboxy methyl hydroxy ethyl cellulose sodium salt was added to this beer so that the final concentration of the material in beer was 0.005% by weight. After 72 hours the beer was polished (final filtration). This beer was found to have a sigma value of 160. When the addition of the carboxy methyl hydroxy ethyl cellulose sodium salt was omitted from the above, the polished beer was found to have a sigma value of 139.

Example II

A 1% solution of soluble carboxy methyl hydroxy ethyl cellulose was added to beer just after the first filtration. The amount of solution added was sufficient so that the final concentration of soluble carboxy methyl hydroxy ethyl cellulose in beer was 500 parts per million. After 24 hours the beer was filtered. The filtered beer had a sigma value of 184. The same beer without the soluble carboxy methyl hydroxy ethyl cellulose had a sigma value of 135.

*Example III*

A sample of finished beer was found to have a sigma value of 138. Soluble carboxy methyl hydroxy ethyl cellulose was then added to the beer in 0.005% concentration, and the sigma value of the beer was increased to 160.

Soluble carboxy methyl hydroxy ethyl cellulose is produced in a number of viscosities. By proper adjustments all are effective for the purpose of the invention. Soluble carboxy methyl hydroxy ethyl cellulose in the quantities used in the practice of the invention is both water soluble and heat stable. It will be understood by those skilled in the art that where the soluble carboxy methyl hydroxy ethyl cellulose is added to a foam forming liquid, for example, beer, as an aqueous solution, the concentration of the solution added may be varied. In general, good results have been obtained by adding soluble carboxy methyl hydroxy ethyl cellulose in the form of a 1% aqueous solution.

The invention is hereby claimed as follows:

1. A method of stabilizing foam in aqueous foam forming liquids which comprises incorporating with such liquids a fraction of a per cent by weight of soluble carboxy methyl hydroxy ethyl cellulose.

2. The method of stabilizing the foam of foam forming fermented malt beverages which comprises adding to the beverage soluble carboxy methyl hydroxy ethyl cellulose in a quantity up to 500 parts by weight per million parts by weight of the beverage.

3. The method of stabilizing the foam of foam forming fermented malt beverages which comprises adding to the beverage soluble carboxy methyl hydroxy ethyl cellulose in a quantity within the range of 50 to 500 parts by weight per million parts by weight of the beverage.

4. A method of improving the foam-head retention capacity of beer which comprises incorporating with beer a fraction of a per cent by weight of soluble carboxy methyl hydroxy ethyl cellulose.

5. A method of improving the foam-head retention capacity of beer which comprises incorporating with beer a quantity up to 500 parts by weight of soluble carboxy methyl hydroxy ethyl cellulose per million parts by weight of the beer.

6. A method of improving the foam-head retention capacity of beer which comprises incorporating with beer a quantity within the range of 50 to 500 parts by weight of soluble carboxy methyl hydroxy ethyl cellulose per million parts by weight of the beer.

7. In the preparation of beer a method of improving the foam-head retention capacity of the beer which comprises adding to the beer at least 24 hours prior to the final filtration a fraction of a per cent by weight of soluble carboxy methyl hydroxy ethyl cellulose.

8. In the preparation of beer a method of improving the foam-head retention capacity of the beer which comprises adding to the beer at least 24 hours prior to the final filtration of quantity within the range of 50 to 500 parts by weight of soluble carboxy methyl hydroxy ethyl cellulose per million parts by weight of the beer.

9. An aqueous form forming liquid containing a fraction of a per cent by weight of soluble carboxy methyl hydroxy ethyl cellulose.

10. An aqueous foam forming carbonated liquid containing a fraction of a per cent by weight of soluble carboxy methyl hydroxy ethyl cellulose.

11. A fermented malt beverage capable of forming a foam and containing soluble carboxy methyl hydroxy ethyl cellulose in a quantity up to 500 parts by weight per million parts by weight of beverage.

12. A fermented malt beverage capable of forming a foam and containing soluble carboxy methyl hydroxy ethyl cellulose in a quantity within the range of about 50 to 500 parts by weight per million parts by weight of beverage.

13. A beer capable of forming a very stable foam and containing a small amount of soluble carboxy methyl hydroxy ethyl cellulose up to about 500 parts by weight per million parts by weight of the beer.

14. A beer capable of forming a very stable foam and containing a small amount of carboxy methyl hydroxy ethyl cellulose sodium salt within the range of about 50 to 500 parts by weight per million parts by weight of the beer.

ALEXANDER FRIEDEN.
HAROLD H. GELLER.

REFERENCES CITED

The following references are of record in the file of this patent:

UNITED STATES PATENTS

| Number | Name | Date |
|---|---|---|
| 2,393,562 | Perech | Jan. 22, 1946 |
| 2,476,331 | Swinehart | July 19, 1949 |
| 2,492,524 | Darling | Dec. 27, 1949 |

OTHER REFERENCES

"Ind. and Eng. Chemistry," October 1945, vol. 37, No. 10, pages 943 to 947.